(12) United States Patent
Moriya et al.

(10) Patent No.: US 6,490,984 B1
(45) Date of Patent: Dec. 10, 2002

(54) METHOD OF MAKING FLUE GAS HARMLESS

(75) Inventors: Masafumi Moriya, Katsushika-ku (JP); Masatake Kawashima, Katsushika-ku (JP); Takashi Ogawa, Katsushika-ku (JP); Kazuhiro Terada, Katsushika-ku (JP)

(73) Assignee: Miyoshi Yushi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/221,172

(22) Filed: Dec. 28, 1998

(51) Int. Cl.$^7$ .............................. B01J 20/00; F23B 7/00
(52) U.S. Cl. ....................... 110/345; 110/344; 110/346; 431/4; 588/205; 502/400; 502/515; 502/516; 95/142; 95/900
(58) Field of Search ............................... 110/345, 165 A, 110/346, 342, 344, 343, 203, 210, 215; 431/2, 4; 95/90, 91, 92, 93, 131, 132, 133, 134, 142, 900

(56) References Cited

U.S. PATENT DOCUMENTS

| | | | | |
|---|---|---|---|---|
| 3,893,949 A | * | 7/1975 | Sakai et al. | |
| 4,038,071 A | * | 7/1977 | Di Bella | |
| 4,258,018 A | * | 3/1981 | Powell | 110/343 X |
| 4,539,044 A | * | 9/1985 | Abu-Moustafa et al. | |
| 4,629,603 A | * | 12/1986 | Salihar et al. | 110/343 X |
| 5,284,636 A | * | 2/1994 | Goff et al. | 588/256 X |
| 5,345,032 A | * | 9/1994 | Marks et al. | |
| 5,457,272 A | * | 10/1995 | Hooykaas | |
| 5,489,420 A | * | 2/1996 | Diep | |
| 5,547,495 A | * | 8/1996 | Wright | |
| 5,609,767 A | * | 3/1997 | Eisenmann | |
| 5,809,775 A | * | 9/1998 | Tarabulski et al. | |
| 5,833,736 A | * | 11/1998 | Durham et al. | |
| 5,937,772 A | * | 8/1999 | Khinkis et al. | 110/345 |
| 5,976,475 A | * | 11/1999 | Peter-Hoblyn et al. | |
| 6,027,543 A | * | 2/2000 | Yoshizaki et al. | |
| 6,046,128 A | * | 4/2000 | Kisen et al. | |
| 6,048,585 A | * | 4/2000 | Martyak et al. | |
| 6,063,348 A | * | 5/2000 | Hinke et al. | |
| 6,063,979 A | * | 5/2000 | Miyata et al. | 588/205 |

FOREIGN PATENT DOCUMENTS

| JP | 8-337881 | * 12/1996 |
|---|---|---|
| JP | 11-230516 | * 8/1999 |

OTHER PUBLICATIONS

Merriam–Webster's Collegiate Dictionary, 10th ed. Springfield, Massachusetts, Merriam–Webster, Incorporated, 1996. p. 311.*

Materials Handbook, 12th ed. New York, McGraw–Hill Book Company, 1986. pp. 693–695.*

* cited by examiner

Primary Examiner—Ljiljana Ciric

(57) ABSTRACT

Formation of dioxins in flue gases is inhibited by contacting the flue gas with at least one of sodium phosphite, calcium phosphate, sodium hypophosphite, and calcium as reducing agents preferably at a temperature in the range of from 150° C. to 850° C. Hydrogen chlorides are also rendered harmless by the contact with the reducing agent. Also, metal ions contained in the fly ash of the flue gas are reduced to metals to reduce the occurrence of dissolution of the metals in subsequent treatment of the fly ash.

15 Claims, No Drawings

METHOD OF MAKING FLUE GAS HARMLESS

BACKGROUND OF THE INVENTION

1. Field of the Invention

The present invention relates to a method for removing and/or reducing formation of harmful substances in flue gas.

2. Description of the Background Art

Various harmful substances are contained in flue gas exhausted from a refuse incineration site or the like, and various treating methods are adopted for removing the harmful substances contained in such flue gas. However, in recent years, extremely toxic chlorides such as dioxins (PCDDS, PCDFS, etc.) may have been contained at a high concentration in flue gas exhausted from a refuse incinerator or the like in some cases, which has become a major social problem.

The incineration treatment of waste in a refuse incineration site is generally conducted through (1) a step of incinerating the waste, (2) a secondary combustion step of heating flue gas generated in the incineration step to a higher temperature to additionally burn unburned substances (for example, carbon monoxide, low molecular weight hydrocarbons, etc.) remaining in the flue gas, (3) a heat recovery step and/or a cooling step to recover heat from the flue gas heated to the higher temperature and/or lowering the temperature of the flue gas, (4) a dust collection step of removing fly ash in the flue gas, (5) a step of making the flue gas harmless by removing harmful substances in the flue gas, and (6) a step of exhausting the flue gas treated in step (5) through a stack. Among these respective steps, dioxins contained in the flue gas are said to be mainly formed in step (3), the heat recovery and/or the cooling step, in which the temperature of the flue gas is lowered, and after that step.

In order to reduce the concentration of chlorides in the flue gas, it is said that spraying of an aqueous solution of calcium hydroxide on the flue gas, which is generally conducted for removing hydrogen chloride in the flue gas, is also effective to some extent. However, this method is not always said to be satisfactory. Therefore, in order to more effectively reduce the chlorides in the flue gas, there is adopted, for example, a method in which flue gas is brought into contact with an adsorbent such as active carbon or active coke to adsorb and remove chlorides in the flue gas. Since this method is simple and effective as a method for removing the chlorides, it is adopted in many refuse incineration site and the like. However, this method requires treating waste active carbon on which the chlorides have been adsorbed and has thus been accompanied by a problem of additional operation cost due to the step of subjecting the waste active carbon to a burning treatment at a high temperature and plant cost due to the burning treatment.

SUMMARY OF THE INVENTION

The present invention has been completed in view of the foregoing circumstances, and has as its object the provision of a method of making flue gas harmless, by which the formation of dioxins and the like in the flue gas can be reduced with good efficiency, and metals contained in fly ash collected in a dust collection step can be prevented from being easily dissolved out.

According to the present invention, there is thus provided a method of making flue gas generated upon incineration of waste harmless, which comprises bringing the flue gas into contact with a reducing agent.

In the method of the present invention, it is preferred that the flue gas is brought into contact with the reducing agent in a step in which the temperature of the flue gas is lowered to 1,000° C. or lower. It is more preferred that the flue gas is brought into contact with the reducing agent in a step in which the temperature of the flue gas is lowered to from 850° C. down to 150° C. It is further preferred that the flue gas be brought into contact with the reducing agent in a heat recovery step of recovering heat of the flue gas and/or a cooling step of lowering the temperature of the flue gas. It is also preferred that the flue gas be brought into contact with the reducing agent after a heat recovery step of recovering heat of the flue gas and/or a cooling step of lowering the temperature of the flue gas, but before a dust collection step. The reducing agent used in the method of the present invention is preferably at least one selected from the group consisting of phosphorous acid and derivatives thereof, hypophosphorous acid and derivatives thereof, metal hydrides, metal hydrogen complex compounds, sulfurous acid and derivatives thereof, boranes, hydrazines, phosphines, hydrogen, and alkali metals. The reducing agent is more preferably at least one selected from the group consisting of phosphorous acid and derivatives thereof, and hypophosphorous acid and derivatives thereof. In the method of the present invention, it is preferred that fly ash in the flue gas be collected in a dust collecting equipment after bringing the flue gas into contact with the reducing agent. As a result, ionic metals contained in the fly ash may be reduced by the reducing agent to keep them in a state in which the metals are hard to dissolve out of the fly ash.

DETAILED DESCRIPTION OF THE PREFERRED EMBODIMENTS

In the present invention, at least one reducing agent selected from the group consisting of phosphorous acid and derivatives thereof, hypophosphorous acid and derivatives thereof, metal hydrides, metal hydrogen complex compounds, sulfurous acid and derivatives thereof, boranes, hydrazines, phosphines, hydrogen, and alkali metals is used as a reducing agent. Examples of the phosphorous acid and derivatives thereof include phosphorous acid, potassium phosphite, sodium phosphite, sodium hydrogen- phosphite, calcium phosphite, magnesium phosphite and ammonium hydrogenphosphite. Examples of the hypophosphorous acid and derivatives thereof include hypophosphorous acid, potassium hypophosphite, sodium hypophosphite and calcium hypophosphite.

Examples of the sulfurous acid and derivatives thereof include sulfurous acid, and sulfites such as ammonium sulfite, sodium sulfite, ammonium hydrogensulfite and sodium hydrogensulfite. Examples of the boranes include boron hydrides (diborane, tetraborane, dihydropentaborane, etc.), monalkyldiboranes (methyldiborane, etc.), dialkyldiboranes (dimethyldiborane, etc.), trialkyldiboranes (trimethyldiborane, etc.), tetraalkyldiboranes (tetramethyldiborane, etc.), and metal salts of boranes (lithium borohydride, sodium borohydride, etc.). Examples of the hydrazines include hydrazine, hydrazine dihydrochloride, hydrazine hydrates, hydrazine hydrochloride and hydrazine sulfate. Examples of the phosphines include primary phosphines such as phosphine, methylphosphine, ethylphosphine, propyl-phosphine, isopropylphosphine, isobutylphosphine, phenyl-phosphine and monoethanolphosphine, secondary phosphines such as dimethylphosphine, diethylphosphine, diisopropylphosphine, diisoamylphosphine, diphenylphosphine and diethanolphosphine, and tertiary phosphines such as trimethylphosphine, triethylphosphine, triphenylphosphine, methyldiphenylphosphine, dimethylphenylphosphine and triethanolphosphine. Examples of the alkali metals include metals such as lithium, sodium and potassium. A solution composed mainly of a waste solution from electroless nickel plating containing any of the above phosphorous acid and derivatives thereof and/or any of the above hypophosphorous acid and derivatives thereof may also be used as the reducing agent. The waste solution from electroless nickel plating basically contains, in addition to the phosphorous acid or the derivative thereof and/or the hypophosphorous acid or the derivatives thereof, ions such as a nickel ion, sulfate ion, complexing agent ion and sodium ion, a brightener, a surfactant, a stabilizer, and a trace amount of metal ion(s) dissolved out of a substance to be plated. The concentrations of these components are not always constant. However, the waste solution contains, for example, about 10 to 55 g/liter of phosphite ions, about 80 to 160 g/liter of hypophosphite ions, about 4 to 7 g/liter of nickel ions, about 30 to 75 g/liter of sulfate ions, about 30 to 55 g/liter of complexing agent ions and about 46 to 120 10 g/liter of sodium ions and has a pH of about 3.5 to 5.5. Incidentally, the waste solution from electroless nickel plating may be subjected to a denickelization treatment so as to substantially contain no nickel ion. An alkali compound and an amide compound may be additionally contained in the waste solution from electroless nickel plating. Examples of the alkali compound include potassium hydroxide, sodium hydroxide, potassium carbonate, potassium hydrogencarbonate, sodium carbonate and sodium hydrogencarbonate. Examples of the amide compound include potassium amide and sodium amide.

At least two of the above-mentioned reducing agents, which are of the same kind but different from each other, or are of different kinds, may be optionally used in combination as the reducing agent. The flue gas generally contains hydrogen chloride. In order to remove this hydrogen chloride, a slurry or powder of calcium hydroxide is usually sprayed on the flue gas. The contact of the reducing agent with the flue gas can inhibit the formation of dioxins, and moreover also has an effect of removing hydrogen chloride contained in the flue gas at the same time.

Even if the precursors of dioxins are contained in flue gas, there is no possibility that dioxins will be formed from the precursors while the temperature of the flue gas is kept high. However, when the temperature of the flue gas is lowered, dioxins tend to be formed from the precursors. Therefore, it is preferred that the flue gas be brought into contact with the reducing agent at a temperature at which the dioxins are easily formed from the precursors, namely, in a step in which the temperature of the flue gas is lowered to 1,000° C. or lower in a waste incineration process, preferably, in a step in which the temperature is lowered from 850° C. down to 150° C. For example, it is preferred to bring the flue gas into contact with the reducing agent in a heat recovery step of recovering heat of the flue gas and/or a cooling step of lowering the temperature of the flue gas by blowing cooling water against the flue gas, or after these steps (but before a dust collection step). Methods for bringing the flue gas into contact with the reducing agent include a method of spraying an aqueous solution or slurry of the reducing agent on the flue gas and a method of spraying powder of the reducing agent on the flue gas. The amount of the reducing agent used varies according to the kind of the reducing agent used. In the case of the phosphorous acid or derivative thereof, or the hypophosphorous acid or derivative thereof, it is preferably 0.01 to 10 g per m$^3$ of the flue gas. In the case of the metal hydride, metal hydrogen complex, borane or hydrazine, it is preferably 0.001 to 7 g per m$^3$ of the flue gas. In the case of the sulfurous acid or derivative thereof, it is preferably 0.1 to 10 g per m$^3$ of the flue gas. In the case of the phosphine or hydrogen, it is 10 preferably 0.01 to 10 liters per m$^3$ of the flue gas. In the case of the alkali metal, it is preferably 0.1 to 5 g per m$^3$ of the flue gas. In the case where at least two reducing agents different in kind from each other are used in combination, it is preferred that their amounts added be suitably controlled within the above preferred ranges of amount of the respective reducing agents to be used according to the mixing proportions of the reducing agents, and the like.

In the method of present invention, it is preferred to collect fly ash in the flue gas in a dust collector after bringing the flue gas into contact with the reducing agent. As the dust collector, there may be used any known dust collector such as an electrical dust precipitator, filter dust separator, centrifugal dust separator, gravitational dust collector or inertial dust collector. According to the method of the present invention, since the flue gas is brought into contact with the reducing agent, metals (ionic metals) in the fly ash contained in the flue gas are reduced to a metallic state by the reducing agent, so that the metals contained in the fly ash become hard to be dissolved out of the fly ash. Accordingly, when the fly ash in the flue gas is collected and removed after bringing the flue gas into contact with the reducing agent, secondary contamination due to the dissolving-out of the metals contained in the fly ash can be made hard to occur. However, a treatment with a metal scavenger for scavenging and fixing metals contained in the flue gas and/or the fly ash may be used in combination as needed. A treatment with calcium hydroxide for removing hydrogen chloride contained in the flue gas may also be used in combination. The metal scavenger and calcium hydroxide may be brought into contact with the flue gas either separately from or at the same time as the reducing agent. The fly ash separated and removed from the flue gas may be treated by solidifying it with cement or the like.

The present invention will hereinafter be described more specifically by the following examples.

EXAMPLES 1 TO 4 and

Comparative Example 1

A means for spraying a reducing agent was provided in the course of a flue through which flue gas (flow rate: 16,000 m$^3$/hr-wet) generated by incinerating refuse in a refuse incinerator was exhausted, and the reducing agent was sprayed by the spraying means to measure the concentration of dioxins contained in the flue gas at the exit of bag filter (BF) after 2 days from the beginning of the spraying. The results thereof are shown together with measured values before the beginning of the spraying in Table 1. The supply of the reducing agent was conducted after heat was recovered from the flue gas by a heat recovery boiler provided in the flue. The kind, spray form and sprayed amount of the reducing agent supplied in each example, and the temperature of the flue gas upon the spraying are shown collectively in Table 1. The flue gas gone through the step of spraying the reducing agent was caused to pass through an electrical dust precipitator to collect fly ash in the flue gas to test whether or not mercury was dissolved out of the fly ash in accordance with the testing method of Notification No. 13 of the Environment Agency of Japan. The results are shown in Table 2.

TABLE 1

| | Reducing agent | | | Temperature of flue gas upon spraying (° C.) | Concentration of dioxins in flue gas (ng/m³N) | |
| --- | --- | --- | --- | --- | --- | --- |
| | | | | | During spraying of reducing agent (*1) | Before spraying of reducing agent (*2) |
| | Kind | Form | Amount sprayed | | | |
| Ex. 1 | Sodium phosphite | 10% Aqueous solution | 3 g/m³ | 400 | 0.012 | 29.6 |
| Ex. 2 | Calcium phosphite | Powder | 0.5 g/m³ | 350 | 0.08 | 21.3 |
| Ex. 3 | Sodium hypophosphite | 5% Aqueous solution | 1 g/m³ | 290 | 0.09 | 18.4 |
| Ex. 4 | Calcium hypophosphite | Powder | 0.1 g/m³ | 230 | 0.12 | 6.21 |
| Comp. Ex. 1 | Active carbon | Powder | 0.5 g/m³ | 350 | 1.25 | 24.3 |

(*1) Average value during spraying of the reducing agent (active carbon in Comparative Example 1).
(*2) Average value before spraying of the reducing agent (active carbon in Comparative Example 1).

TABLE 2

| | Amount of mercury dissolved out of fly ash (mg/l) | |
| --- | --- | --- |
| | After 2 days from the beginning of spraying of reducing agent | Before the beginning of spraying of reducing agent |
| Example 1 | <0.005 | 0.053 |
| Example 2 | <0.005 | 0.074 |
| Example 3 | <0.005 | 0.086 |
| Example 4 | <0.005 | 0.026 |
| Comparative Example 1 | 0.038 | 0.049 |

EXAMPLES 5 AND 6 and

Comparative Example 2

A means for spraying a reducing agent was provided in the course of a flue through which flue gas (flow rate: 7,800 m³/hr-wet) generated by incinerating refuse in a refuse incinerator was exhausted, and the reducing agent was sprayed by the spraying means to measure the concentration of dioxins contained in the flue gas at the exit of BF after 2 days from the beginning of the spraying. The results thereof are shown collectively together with measured values before the beginning of the spraying, the kind, spray form and sprayed amount of the reducing agent supplied in each Example, and the temperature of the flue gas upon the spraying in Table 3. The flue gas gone through the step of spraying the reducing agent was caused to pass through an electrical dust precipitator to collect fly ash in the flue gas to test whether lead was dissolved out of the fly ash or not in accordance with the testing method of Notification No.13 of the Environment Agency of Japan. The results are shown in Table 4.

TABLE 3

| | Reducing agent | | | Temperature of flue gas upon spraying (° C.) | Concentration of dioxins in flue gas (ng/m³N) | |
| --- | --- | --- | --- | --- | --- | --- |
| | | | | | During spraying of reducing agent (*1) | Before spraying of reducing agent (*2) |
| | Kind | Form | Amount sprayed | | | |
| Ex. 5 | Sodium borohydride | 10% Aqueous | 0.6 g/m³ | 280 | 0.16 | 35.2 |
| Ex. 6 | Aluminum lithium hydride | Powder | 0.04 g/m³ | 330 | 0.09 | 26.2 |
| Comp. Ex. 2 | Active carbon | Powder | 0.5 g/m³ | 350 | 0.68 | 16.5 |

(*1) Average value during spraying of the reducing agent (active carbon in Comparative Example 2.)
(*2) Average value before spraying of the reducing agent (active carbon in Comparative Example 2.)

TABLE 4

| | Amount of lead dissolved out of fly ash (mg/l) | |
| --- | --- | --- |
| | After 2 days from the beginning of spraying of reducing agent | Before the beginning of spraying of reducing agent |
| Example 5 | 0.25 | 1.56 |
| Example 6 | 0.11 | 2.44 |
| Comparative Example 2 | 5.25 | 5.53 |

As has been described above, the methods of the present invention permit effectively inhibiting the formation of dioxins in flue gas because the reducing agent is brought into contact with the flue gas in the process of the incineration treatment of substances such as waste. The methods do not require any special plant or step for treating a waste adsorbent, which is required of a method of adsorbing and removing dioxins formed by an adsorbent such as active carbon, and hence can contribute to reduction in the concentration of chlorides in the flue gas at low cost. When fly ash in the flue gas is collected and removed after bringing the flue gas into contact with the reducing agent, ionic metals contained in the fly ash are reduced up to a neutral metallic state by the reducing agent, so that the methods of the present invention have an effect of effectively preventing the metals from being dissolved out of the fly ash.

What is claimed is:

1. A method for treating flue gas generated by incineration of waste to chemically reduce the amount of dioxins in the flue gas comprising contacting the flue gas with at least one reducing agent selected from the group consisting of sodium phosphite, calcium phosphite, sodium hypophosphite, and calcium hypophosphite, whereby the amount of dioxins contained in the flue gas to be exhausted is chemically reduced.

2. The method according to claim 1, which further comprises lowering the temperature of the flue gas to not more than 1000° C., and contacting the flue gas with said reducing agent while lowering the temperature.

3. The method according to claim 2, wherein the temperature of the flue gas is lowered to a temperature in a range of from 150° C. to 850° C.

4. The method according to claim 1, which further comprises recovering heat from the flue gas and contacting the flue gas with said reducing agent while recovering heat.

5. The method according to claim 1, which further comprises recovering heat from the flue gas or lowering the temperature of the flue gas, or both lowering the temperature and recovering heat before contacting the flue gas with the reducing agent.

6. The method according to claim 1, further comprising the step of collecting dust present in the flue gas.

7. The method according to claim 1, wherein said flue gas contains fly ash, said method further comprising separating and collecting the fly ash in a dust collector.

8. The method according to claim 1, wherein said flue gas contains hydrogen chloride, and wherein said step of contacting the flue gas with said at least one reducing agent also chemically reduces the hydrogen chloride.

9. The method according to claim 1, wherein said flue gas comprises hydrogen chloride and fly ash, said method further comprising the step of collecting the fly ash in a dust collector.

10. The method according to claim 1, wherein said reducing agent is waste solution from electroless nickel plating.

11. The method according to claim 1, wherein the step of contacting flue gas with said at least one reducing agent comprises spraying said at least one reducing agent in powdered form into said flue gas.

12. The method according to claim 1, wherein the flue gas is contacted with from 0.01 g to 10 g of said at least one reducing agent per cubic meter of flue gas.

13. A method for chemically reducing water soluble metal ions contained in fly ash in flue gas generated upon incineration of refuse, said method comprising contacting the fly ash containing flue gas at a temperature in the range of from 850° C. to 150° C., with an aqueous solution of at least one reducing agent selected from the group consisting of sodium phosphite, calcium phosphite, sodium hypophosphite, and calcium hypophosphite, to thereby convert metal ions in the fly ash to water insoluble metals.

14. The method according to claim 13 wherein said aqueous solution of said one reducing agent is waste solution from electroless nickel plating.

15. A method for chemically reducing the amount of hydrogen chloride contained in flue gas and inhibiting formation of dioxins generated upon incineration of refuse, said method comprising contacting the flue gas at a temperature of from 150° C. to 850° C. with an aqueous solution of at least one reducing agent selected from the group consisting of sodium phosphite, calcium phosphite, sodium hypophosphite, and calcium hypophosphite, thereby chemically reducing the amount of hydrogen chloride and inhibiting formation of dioxins.

* * * * *